United States Patent [19]

Nelson

[11] Patent Number: 4,644,812
[45] Date of Patent: Feb. 24, 1987

[54] GEAR MECHANISM FOR BRAKE ADJUSTMENT

[75] Inventor: Bertel S. Nelson, Naperville, Ill.

[73] Assignee: Wedgtrac Corporation, Naperville, Ill.

[21] Appl. No.: 690,897

[22] Filed: Jan. 14, 1985

[51] Int. Cl.⁴ .................. F16D 65/48; F16H 1/16
[52] U.S. Cl. .......................... 74/425; 74/439; 74/458; 74/522; 188/79.5 K; 188/196 M
[58] Field of Search ............ 74/425, 458, 439, 444, 74/522, 525; 188/79.5 K, 196 M

[56] References Cited

U.S. PATENT DOCUMENTS

| | | | |
|---|---|---|---|
| 2,173,660 | 9/1939 | Perkins | 74/425 |
| 3,398,590 | 8/1968 | Campbell et al. | 74/425 |
| 3,901,357 | 8/1975 | Reitz et al. | 188/196 M |
| 4,057,128 | 11/1977 | Coupland | 188/79.5 K |
| 4,121,703 | 10/1978 | Moss | 188/79.5 K |
| 4,310,087 | 1/1982 | Gawler | 74/425 |
| 4,380,276 | 4/1983 | Sweet et al. | 188/79.5 K |
| 4,484,665 | 11/1984 | Svensson | 188/79.5 K |
| 4,499,978 | 2/1985 | Norcross | 188/79.5 K |
| 4,561,523 | 12/1985 | Ott | 188/79.5 K |

FOREIGN PATENT DOCUMENTS

| | | | |
|---|---|---|---|
| 869012 | 1/1953 | Fed. Rep. of Germany | 188/79.5 K |
| 2117520 | 11/1977 | Fed. Rep. of Germany | 74/440 |
| 292870 | 6/1928 | United Kingdom | 74/439 |
| 928578 | 6/1963 | United Kingdom | 74/440 |

Primary Examiner—Allan D. Herrmann
Attorney, Agent, or Firm—Trexler, Bushnell & Wolters, Ltd.

[57] ABSTRACT

Adjusting mechanism is provided for the brakes of a highway trailer. A brake lever is actuated by a pneumatic cylinder and carries a worm gear which is mounted for turning with the lever, and also independently of the lever. The worm gear is splined for non-rotatable reception of a brake shaft. A saddle pinned to the lever carries a tapered worm which meshes with the worm gear. The worm gear is axially split, and the two halves thereof are forced axially away from one another by the worm under load into engagement with surfaces fixed relative to the lever for frictionally fixing said gear relative to said lever. The tapered worm also wedges the periphery of the gear into frictional engagement with a surrounding part of the lever. The worm is turnable to adjust the rotational position of the gear and hence of the brake shaft when not under load, and the worm is lockable in adjusted position.

9 Claims, 4 Drawing Figures

GEAR MECHANISM FOR BRAKE ADJUSTMENT

BACKGROUND OF THE INVENTION

Adjustment mechanisms are provided for adjusting the brakes on highway trailers. In accordance with the prior art a pneumatic cylinder is connected through a suitable connecting rod to a pivoted lever arm. This lever arm carries a worm wheel at the opposite end from the pneumatic cylinder connecting shaft, and this worm wheel is splined to a shaft that actually operates the brakes on the trailer. A worm meshes with the worm wheel or gear and is locked in position during brake operation, thus to lock the worm gear to the arm for turning of the brake shaft in accordance with pivoting of the lever arm. The lock on the worm is releasable so that the worm can be turned mechanically to turn the worm gear, thus turning the brake shaft and taking up slack due to brake wear or shifting or distortion of parts. Little turning force on the worm is necessary for such adjustment as the gear is not under load except during braking.

The aforesaid prior art adjustable mechanism for operating trailer brakes has enjoyed wide commercial success. Parts are sold in extremely large numbers, and at low, competitive costs. During pivoting of the lever arm to turn the brake shaft rather considerable force is applied to the contacting teeth of the worm and gear, the actual force applied to the teeth being reduced somewhat by shifting or deformation of parts causing binding of such parts together.

OBJECTS AND SUMMARY OF THE PRESENT INVENTION

It is an object of the present invention to provide a brake slack adjustment for highway trailers, generally in accordance with the prior art, having reduced manufacturing cost and increased torque capability.

In accordance with the present invention, a double taper worm is provided. An hourglass worm could be used, but is considerably more expensive. The worm gear is made as two axially adjacent halves in accordance with powder metal technology, whereby the halves may move slightly apart during braking operation, thus to wedge the faces of the gear against adjacent parts of the lever arm. The lever arm and a saddle housing for the worm and a part of the worm gear are joined by pins in slightly off center and off size holes, whereby to produce an improved wedging action between the gear and the arm, thereby to reduce the force that must be transmitted by the teeth of the worm and gear.

THE DRAWINGS

The present invention will best be understood with reference to the following specification when taken in connection with the accompanying drawings wherein.

DETAILED DESCRIPTION OF THE ILLUSTRATED EMBODIMENT

Figure 1:
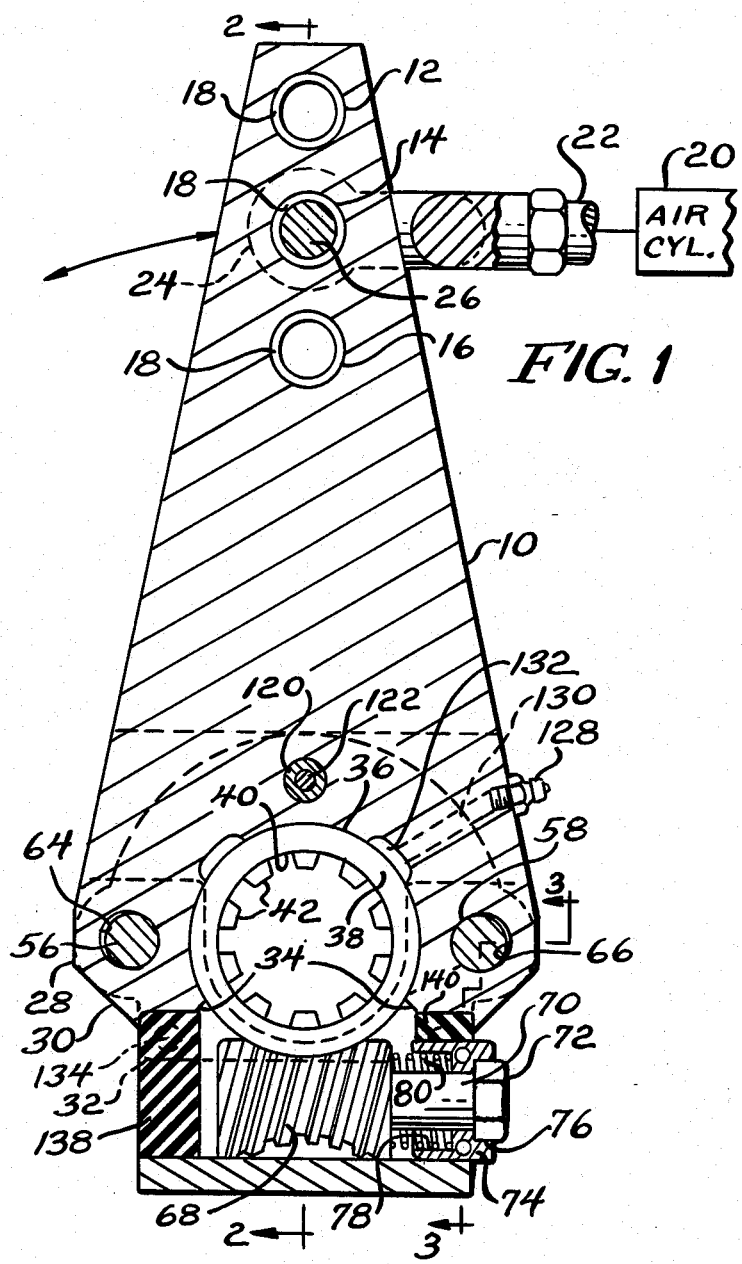
FIG. 1 is a front view, partially in section, of a highway trailer brake operating mechanism constructed in accordance with the present invention.

An adjustable brake operating mechanism constructed in accordance with the present invention includes a lever arm 10 of tapered construction, wider at the bottom than at the top, and near the top having a series of three spaced holes 12, 14 and 16, each of which is lined with a bearing sleeve 18. A pneumatic or air cylinder 20 is provided with a connecting rod 22 having a clevis 24 at the opposite end from the air cylinder carrying a transverse pin 26 received in one of the bearing sleeves 18. In the illustrated embodiment the pin 26 is received in the bearing sleeve of the central hole 14. It will be appreciated that the different holes are provided to provide a different turning or radius length for the arm 10.

Figure 2:
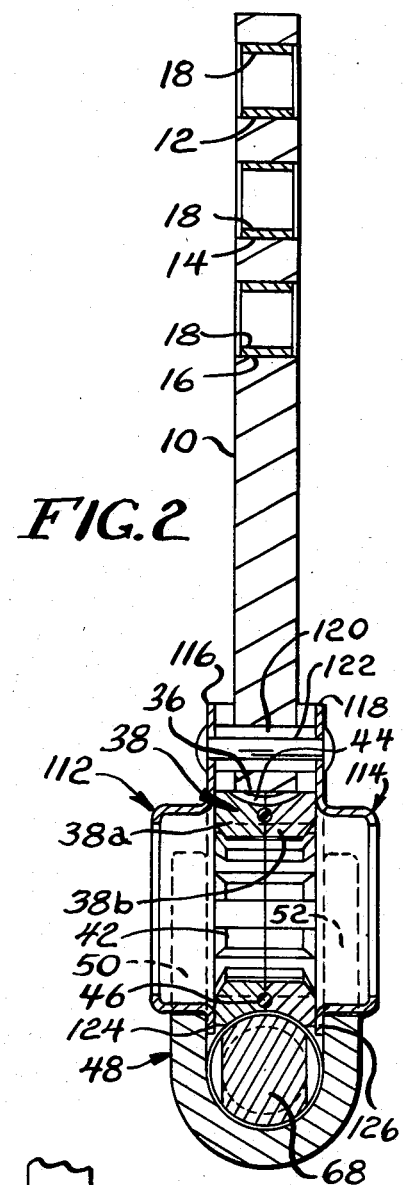
FIG. 2 is a sectional view taken substantially along the line 2—2 in FIG. 1.

As noted heretofore, the arm is wider near the bottom, having a maximum width at 28 and tapering inwardly therefrom at 30 to a bottom corner 32 on each side, and diagonally upwardly and inwardly at 34 to a somewhat greater than semicircular recess 36 housing a worm wheel 38. The worm gear 38 has a central aperture 40 provided with axial splines 42 for splining of a shaft thereto which actually operates the trailer brakes. The worm gear 38, as best seen in FIG. 2, is a split gear having two axially confronting, similar halves 38a and 38b. The halves are preferably made by a powdered metal technology involving sintering and is provided with worm teeth 44. The two halves of the worm gear have a rubber O-ring 46 clamped in confronting annular recesses as a grease seal to prevent grease from travelling radially inwardly through the gear and out of the area where it should be.

At the bottom of the arm 10 there is provided a U-shaped saddle 48, which like the arm is made of a suitable grade of steel. The saddle has upstanding side portions 50 and 52 lying on opposite sides of the arm 10, and spaced therefrom by suitable spacers 54, since the saddle must span the worm gear 38, which is axially of greater dimension than is the arm 10. A pair of pins 56 and 58 join the worm saddle 48 to the arm 10. The pins are of ½ inch diameter and fit tightly in respective holes 60 and 62 in the upper portions 50 and 52 of the U-shaped saddle 48. These holes are spaced three inches from center to center. The pins extend through holes 64 and 66 in the arm 10 which are on 3-1/32 inch centers, and the holes are of 17/32 inch diameter. The pin 56 touches the hole 64 at the 3 o'clock position, while the pin 58 touches the side of the hole 66 at the 9 o'clock position, all directions being considered with regard to FIG. 1. The effect of the slight mismatch of hole size and position will be discussed hereinafter.

A worm 68 is mounted within the lower portion of the saddle 48, and is illustrated in FIG. 1 as being an hourglass type of worm, having external threads thereon meshing with the teeth 44 of the worm gear. The gear could equally well have a portion of uniform central diameter, and two equal tapering sections at opposite ends thereof, as disclosed in my copending application Ser. No. 668,196, filed Nov. 5, 1984 for "TAPERED WORM", and illustrated somewhat schematically hereinafter in connection with FIG. 4. The worm 68 is provided with an integral or otherwise fixed axial shaft 70 extending to the right in FIG. 2 and having a polygonal head 72 thereon, which by way of example is hexagonal. The head 72 is received in a socket 74 having a complementary recess 76 therein. The socket 74 has at the opposite end thereof a recess 78 confronting the adjacent end of the worm 68. This recess preferably is circular and houses a compression spring 80 which urges the socket to the right and away from the worm 68.

Figure 3:
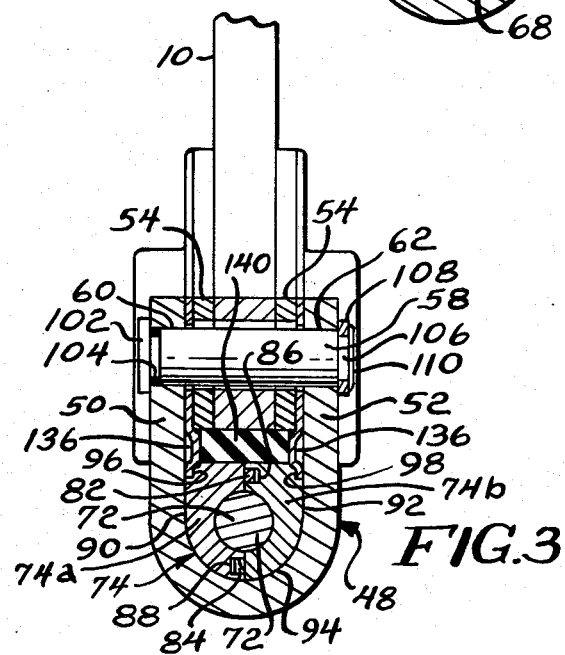
FIG. 3 is a sectional view taken substantially along the line 3—3 in FIG. 1.

As best may be seen in FIG. 3, the nut 74 is comprised of adjacent halves 74a and 74b which are joined to each other by respective integral extending pins 82 and 84 received in recesses 86 and 88 of the confronting halves. The socket, as best seen in FIG. 3 has a non-circular exterior, having opposite parallel sides 90 and 92 engaging the upstanding parallel portions 50 and 52 of the saddle 48, interconnected by a semicylindrical lower portion 94 conforming to the interior shape of the saddle 48. The nut therefore is non-rotatable. The upper corners of the nut are notched at 96 and 98 to accommodate another part as hereinafter set forth.

When a standard socket or box wrench is engaged with the head 72 and pushed to the left it moves the socket 74 out of engagement with the head 72 and the shaft 72 and worm 68 may now be rotated. The worm in turn turns the worm gear 38 to effect turning of the brake shaft splined therein, whereby to take up wear, deformation, or bending of parts, so that the same stroke of the connecting rod 22 of the air cylinder 20 will always produce the same braking effect. When the shaft 70 has been turned to a desired adjusted position, the tool holding the socket 74 to the left may be retracted, whereby to allow the socket to return to locking engagement with the head as illustrated in FIG. 1.

The pins 56 and 58 are provided with flat heads 102 with sealing O-rings 104 respectively in annular recesses beneath the heads. At the opposite end each pin has a reduced diameter portion 106 which is surrounded by a washer 108, the end of the reduced diameter section being peened over at 110 to hold the parts together.

End caps 112 and 114 surround the gear 38 and have upwardly projecting portions 116 and 118 which are secured to the arm 10 by a cross sleeve 120 and a pin or rivet 122 extending through the upwardly projecting parts and through a hole appropriately provided in the arm 10. Lower projecting flanges 124 and 126 fit within the U-shaped trough 48 to position and retain the lower portions of the end caps 112 and 114. A grease fitting 128 is provided in the side of the arm, and a passageway 130 connects this fitting with a recess 132 in the arm adjacent to the gear 38.

Dimples 134 and 136 in the caps 112 and 114 respectively grip rubber sealing blocks 138 and 140 in place at the left end of the worm 68 and above the nut 74 to retain grease about the worm 78 for lubricating the worm and gear.

Figure 4:
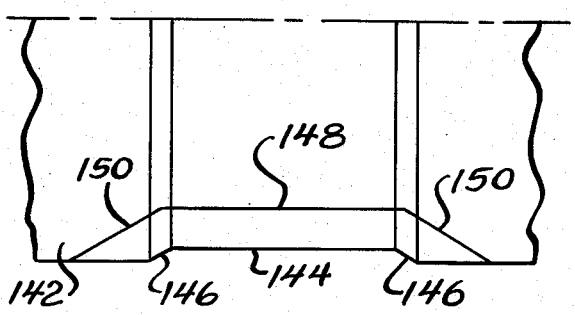
FIG. 4 is a somewhat diagramatic view showing a worm blank of the type used in the present invention.

As noted heretofore, a modification of the worm, or specifically the worm blank, is shown in FIG. 4. A portion of the worm blank 142 on an enlarged scale is shown, and includes a straight center portion 144 of uniform diameter, and two outwardly tapered portions 146 at either end thereof. The worm that will be formed on the blank will have a root 148 of uniform diameter, and outwardly tapered end portions 150 of equal taper. As explained in my aforesaid copending application Ser. No. 668,196 similar results are obtained to those obtained with the hourglass worm, but at much lower cost since the worm can be rolled for forming, whereas this is impossible with an hourglass worm.

When torque load is applied, as by pivoting of the arm 10, for example in the counterclockwise direction, the worm shifts axially, thus jamming the enlarged pitch diameter threads spaced outwardly from the center of the worm radially into the gear teeth, forming a more intimate contact and support between the respective teeth of the worm and the gear, and thereby permitting higher loads to be carried. This jamming of the worm and worm gear together shifts the gear radially somewhat, thereby clamping the periphery of the gear against adjacent portions of the arm, and furthermore causes an axial separation of the halves of the worm gear, thereby causing the outer faces thereof to wedge against adjacent portions, specifically of the end caps 112 and 114, thereby transferring part of the load frictionally, rather than through the worm thread and gear teeth.

The mismatch of the pins 56 and 58 in the holes 64 and 66 has been described heretofore. The hole 64 moves downwardly, while the hole 66 moves upwardly. The surface defining the hole 64 thus bears against the pin 56 at a position between 1 and 2 o'clock, while the material defining the hole 66 bears against the pin 58 in a position between 7 and 8 o'clock. The saddle, considering the two thicknesses thereof, is heavier than the arm and will have minimum deflection. Accordingly, the portions of the arm 10 lying on either side of the gear 38, specifically adjacent the pins 56 and 58, are deflected toward one another, thereby frictionally to grip the outer portion of the gear, and thus frictionally to lock the gear to the arm, whereby a major part of the turning force is thus connected directly from the arm to the gear and to the shaft without having to pass through the teeth of the gear and the thread on the worm. The taper of the worm is important, whether it is by way of an hourglass worm, or a worm having a uniform central portion and tapered ends.

From the foregoing it will be apparent that a superior structure for adjusting the brakes on highway trailers has been provided. It is less expensive to manufacture, due to the powdered metal sintering techniques used in producing the halves of the worm gear and in producing the socket 74, while greater frictional engagement of the gear to adjacent structure is provided than has been done heretofore, thereby lessening the percentage of the torque that must be transmitted by engagement of the teeth of the worm gear and the thread of the worm.

The specific example of the invention as heretofore shown and described will be understood as being for illustrative purposes only. Various changes in structure will no doubt occur to those skilled in the art and will be understood as forming a part of the present invention insofar as they fall within the spirit and scope of the appended claims.

The invention is claimed as follows:

1. Adjusting mechanism such as for brake adjustment comprising a turnable member, a worm gear having a continuous circumferential succession of teeth mounted for turning with said member and independently of said member, said member having a part thereof disposed in close adjacent relation to the periphery of said gear, said worm gear being adapted to be secured to a shaft such as a brake operating shaft, a tapered worm, means mounting said worm from said member in meshing engagement with said worm gear, means for turning said worm and said gear relative to said member for effecting adjustment of said member relative to a shaft secured to said gear, and means for locking said worm against rotation for locking said worm gear relative to said member for turning of said worm gear with said member, turning of said member causing said gear to mesh with a larger diameter portion of said tapered worm, said tapered worm thereby forcing said perimeter of said gear into clamping engagement with said part of said member upon turning of said member.

2. Adjusting mechanism as set forth in claim 1 and further including a saddle secured to said member and carrying said worm.

3. Adjusting mechanism as set forth in claim 1 wherein said worm gear is axially split, having two axially adjacent halves rotatable together, said gear having end faces, and means fixed relative to said member and providing surfaces axially adjacent said faces in close relation thereto, meshing of said gear with a larger diameter portion of said tapered worm under load forcing said halves of said gear axially away from one another and said faces frictionally engaging said surfaces.

4. Adjusting mechanism as set forth in claim 3 and further including a saddle secured to said member and carrying said worm.

5. Adjusting mechanism such as for brake adjustment comprising a turnable member, a worm gear mounted for turning with said member and independently of said member, said worm gear being adapted to be secured to a shaft such as a brake operating shaft, a tapered worm, means mounting said worm from said member in meshing engagement with said worm gear, means for turning said worm and said gear relative to said member for effecting adjustment of said member relative to a shaft secured to said gear, means for locking said worm against rotation for locking said worm gear relative to said member for turning of said worm gear with said member, said member having a part thereof disposed in close adjacent relation to the periphery of said gear, said tapered worm forcing said perimeter of said gear into clamping engagement with said part of said member upon turning of said member, and a saddle carrying said worm and secured to said member by a plurality of pins extending through holes in said saddle and in said member with corresponding holes relatively off center to enhance clamping engagement between said member parts and the periphery of said gear.

6. Adjusting mechanism as set forth in claim 5 wherein said pins and the holes in said saddle are of substantially the same predetermined diameter and are disposed on opposite sides of said gear, and wherein the holes in said member are slightly larger than said predetermined diameter, and the centers of the holes in said member are disposed slightly farther from the center of said gear than are the centers of the holes in said saddle.

7. Adjusting mechanism such as for brake adjustment comprising a turnable member, a worm gear mounted for turning with said member and independently of said member, said worm gear being adapted to be secured to a shaft such as a brake operating shaft, a tapered worm, means mounting said worm from said member in meshing engagement with said worm gear, means for turning said worm and said gear relative to said member for effecting adjustment of said member relative to a shaft secured to said gear, means for locking said worm against rotation for locking said worm gear relative to said member for turning of said worm gear with said member, said worm gear being axially split, having two axially adjacent halves, said gear having end faces, means fixed relative to said member and providing surfaces axially adjacent said faces in close relation thereto, said halves of said gear moving axially away from one another under load and said faces frictionally engaging said surfaces, said member having a part thereof disposed in close adjacent relation to the periphery of said gear, said tapered worm forcing said perimeter of said gear into clamping engagement with said part of said member upon turning of said member, and a saddle carrying said worm and secured to said member by a plurality of pins extending through holes in said saddle and in said member with corresponding holes relatively off center to enhance clamping engagement between said member parts and the periphery of said gear.

8. Adjusting mechanism as set forth in claim 7 wherein said pins and the holes in said saddle are of substantially the same predetermined diameter and are disposed on opposite sides of said gear, and wherein the holes in said member are slightly larger than said predetermined diameter, and the center of the holes in said member are disposed slightly farther from the center of said gear than are the centers of the holes in said saddle.

9. Worm gearing comprising a tapered worm, means rotatably mounting said worm, a worm gear having a continuous circumferential succession of teeth, means rotatably mounting said worm gear in mesh with said worm, said gear having end surfaces, and faces mounted closely adjacent to said end surfaces, said worm gear being axially split and having two axially adjacent halves, said worm under load moving axially and bringing a higher portion of said worm into mesh with said worm gear and thereby forcing said gear halves axially away from one another and said end faces thereby engaging said end surfaces.

* * * * *